United States Patent

Landscheidt et al.

[11] Patent Number: 5,241,011
[45] Date of Patent: Aug. 31, 1993

[54] PROCESS FOR THE PRODUCTION OF POLYACRYLIC ACIDS

[76] Inventors: Alfons Landscheidt, Lefarthstr. 11; Andreas Gebauer, Schreinerstr. 4, both of 4150 Krefeld, Fed. Rep. of Germany

[21] Appl. No.: 917,014

[22] PCT Filed: Feb. 15, 1991

[86] PCT No.: PCT/EP91/00298
§ 371 Date: Aug. 7, 1992
§ 102(e) Date: Aug. 7, 1992

[87] PCT Pub. No.: WO91/12278
PCT Pub. Date: Aug. 22, 1991

[30] Foreign Application Priority Data

Feb. 19, 1990 [DE] Fed. Rep. of Germany ....... 4004953

[51] Int. Cl.$^5$ .......................... C08F 8/12; C08F 30/04
[52] U.S. Cl. .............................. 525/330.2; 526/240; 526/288; 526/317.1
[58] Field of Search ............... 526/240, 288, 317.1; 525/330.2

[56] References Cited

U.S. PATENT DOCUMENTS

| | | | |
|---|---|---|---|
| 3,764,502 | 10/1973 | Restaino | 526/240 |
| 4,486,489 | 12/1984 | George | 526/240 |
| 4,840,985 | 6/1989 | Gonnet et al. | 524/427 |
| 4,845,191 | 7/1989 | Hautier | 528/496 |
| 4,868,228 | 9/1989 | Gonnet et al. | 524/425 |
| 4,914,170 | 4/1990 | Chang et al. | 526/240 |

FOREIGN PATENT DOCUMENTS

| | | | |
|---|---|---|---|
| 60-32810 | 2/1985 | Japan | 526/240 |
| 61-115904 | 6/1986 | Japan | 526/240 |
| 61-243805 | 10/1986 | Japan | 526/240 |
| 331306 | 2/1991 | Japan | 526/240 |
| 2093464 | 9/1982 | United Kingdom | 526/240 |

Primary Examiner—Joseph L. Schofer
Assistant Examiner—N. Sarofim
Attorney, Agent, or Firm—Sprung Horn Kramer & Woods

[57] ABSTRACT

The invention relates to a process for producing polyacrylic acids and copolymers of acrylic acid with up to 50 mol-% of comonomers. These compounds have a molecular weight of less than 100,000, measured at a pH-value of 8, and 10 to 60 mol-% are neutralized with calcium hydroxide. The invention also relates to the use of these products as grinding and dispersing aids for calcium carbonate.

6 Claims, No Drawings

PROCESS FOR THE PRODUCTION OF POLYACRYLIC ACIDS

BACKGROUND OF THE INVENTION

The present invention relates to a process for producing polyacrylic acids and copolymers of acrylic acid with up to 50 mol-% of comonomers. These compounds have a molecular weight of less than 100,000, measured at a pH-value of 8, and 10 to 60 mol-% are neutralized with calcium hydroxide. The present invention further relates to the use of such products as grinding and dispersing aids for calcium carbonate.

Polyacrylic acids may be applied in many fields. They may be used, e.g., as anti-deposition agent in water cycles and as grinding and/or dispersing aid in the production of pigment suspensions. In this connection the grinding and dispersion of calcium carbonate is of particular interest. Finely ground calcium carbonate is used as filler in the paper industry.

Polyacrylic acids are manufactured by polymerizing acrylic acid. In general, the polymerization is carried out in a solvent, preferably water or mixtures of water and isopropanol are used.

German Patent Application No. 34 32 082 describes the production of alkaline-earth acrylate from acrylic acid and alkaline-earth carbonate. Alkali acrylate is obtained by further reaction with alkali bicarbonate.

European Patent No. 0100948 relates to the use of polymers of acrylic acid as dispersing aids. For this purpose the polyacrylic acid is neutralized only partially.

European Patent No. 0046573 mentions that the polyacrylic acids claimed as grinding aids may be neutralized with the hydroxides of sodium, potassium, ammonium, zinc or calcium, or with primary, secondary, or tertiary amines.

According to European Patent No. 0127388 a phase separation, which can be used to purify the polymer, may be achieved by adding $C_1$ to $C_5$ alcohols to the neutralized aqueous polyacrylic acid solution. Sodium, potassium, lithium and ammonium are mentioned as cations suitable for the neutralization.

European Patent No. 0129329 deals with the same problem and the same cations.

In most cases the polyacrylic acid must be present in neutralized form. Sodium, ammonium, potassium, calcium, magnesium, amines or combinations thereof are usually employed as couterions. The maximum proportion of ions which—when used alone—form an insoluble polyacrylate may naturally only be so high that the polyacrylic acid is not yet precipitated. For this reason the maximum possible amount of calcium ions, for example, is 60 mol-%.

According to the teaching of European Patent No. 0100947 it is appropriate to use polyacrylic acids which are partially neutralized with calcium as grinding aids. The polymerization takes place in mixtures of isopropanol and water. On the other hand, acrylic acid partially neutralized with calcium cannot be polymerized in the presence of isopropanol without causing the precipitation of the polymer. The neutralization with calcium may only be carried out when the isopropanol has been distilled off the polyacrylic acid solution, since, otherwise, precipitation of the polymers occurs. Neutralizing the polyacrylic acid with calcium hydroxide after the polymerization has taken place involves numerous serious disadvantages. For example, it takes a long time until the calcium hydroxide dissolves in the polymer solution, in addition, the polymer solution is extremely turbid even after the neutralization.

SUMMARY OF THE INVENTION

It is the object of the present invention of provide polymers of the acrylic acid which are partially neutralized with calcium and do not exhibit the above mentioned disadvantages of working according to EP 0100947.

This object is achieved by a process for the production of polyacrylic acids and copolymers of acrylic acid, respectively, with up to 50 mol-% of comonomers which, measured at a pH of 8.0, have a molecular weight of less than 100,000 and are neutralized with calcium hydroxide by 10 to 60 mol-%. This process is characterized by the fact that the acrylic acid is partially neutralized with calcium hydroxide prior to polymerization and that the further neutralization is carried out with monovalent bases after the polymerization.

Surprisingly, it was found that the neutralization of the monomeric acrylic acid with calcium hydroxide takes place considerably faster and leads to improved results as compared to the neutralization of polyacrylic acids after polymerization thereof.

The polymers according to the present invention preferably have a molecular weight of 500 to 50,000, determined according to the method of gel-permeation-chromatography, in particular, they have a molecular weight of 3,000 to 9,000.

N-alkyl substituted acrylamides or methacrylamides having a tertiary amino group at the alkyl residue may be used as comonomers.

Examples thereof include: dimethylaminopropyl acrylamide, dimethylaminopropyl methacrylamide, dimethylamino-2,2-dimethylpropyl acrylamide, dimethylamino-2,2-dimethylpropyl methacrylamide, and dimethylaminoethyl acrylamide. These monomers may also be present in quaternized form, such as the trimethylacrylamidopropyl ammonium chloride.

Further examples of monomers include acrylamide, methacrylamide, methacrylic acid, 2-acrylamido-2-propane sulfonic acid, methyl acrylate, hydroxypropyl acrylate, and acrylonitrile.

By using said comonomers a modification of the properties of the copolymers is to be achieved. After the polymerization, neutralization of the polyacrylic acid is completed with an aqueous monovalent base, e.g., sodium hydroxide solution, ammonia, or potassium hydroxide solution.

The polymers according to the present invention may be used for many purposes. The production of concentrated suspensions of solids is a preferred application. Pigment suspensions manufactured by using the copolymers according to the present invention exhibit a considerably improved storage stability as compared to the products of EP 0100947.

Thus the present invention further relates to the use of the process products, in particular as grinding and dispersing aids for calcium carbonate. The quantity applied as grinding and dispersing aid amounts to between 0.1 and 1.0%-wt., each relative to solid (polymer) to solid (calcium carbonate).

DESCRIPTION OF THE PREFERRED EMBODIMENTS

The polyacrylic acids according to the present invention may be obtained by polymerization methods known per se. Polymerization is carried out in an aqueous solution and is initiated by means of radical polymerization catalysts.

Redox systems and/or thermally decomposing radical formers of the type of azo compounds, e.g., azoisobutyric acid dinitrile can be used. Suitable redox systems include: combinations of hydrogen peroxide, salts of the peroxy disulfuric acid or tert.-butyl-hydroperoxide with sodium sulfite or sodium dithionite as reduction component.

The molecular weights of less than 100,000 according to the present invention are suitably achieved by carrying out the polymerization in the presence of polymerization regulators. Effective regulators include hydroxylammonium salts as well as mercaptans, e.g., mercaptoethanol or thioglycollic acid.

The polymerization is advantageously carried out under adiabatic conditions. In this case, the polymerization is suitably started at low temperatures, e.g., at 20° C. The final temperature achieved by the liberated polymerization heat depends on the monomers used and on the concentration ratios; in case of an adequate pressure it may amount, for example, to up to 180° C.

Another method of carrying out the polymerization is to prepare a portion of the monomer mixture, start the copolymerization and then continuously charge the monomer mixture. The temperature during the copolymerization may vary within wide ranges.

Depending on the catalysts employed temperatures between 50° C. and 200° C. may be optimum temperatures. It is also possible to carry out the polymerization at the boiling point of the solvent, or under pressure at temperatures above that.

The monomer solution is partially neutralized with calcium hydroxide prior to polymerization. It is suitable to produce a suspension of calcium hydroxide in water in which the acrylic acid, and possibly the comonomers, are subsequently introduced. It is, however, also possible to add the calcium hydroxide to the prepared monomer solution. According to the present invention 10 to 60 mol-% of the acrylic acid are neutralized with calcium. If 60 mol-% is exceeded, precipitation of the insoluble calcium polyacrylate occurs during the polymerization.

EXAMPLE 1

38 g calcium hydroxide are suspended in 700 g water, then 250 g acrylic acid are added. Within a period of 15 minutes the calcium hydroxide is dissolved, the temperature rising from 20° C. to 32° C.

The turbidimetric measurement results in a value of 3.5 TU(F) (turbidity units relative to formazine standard). After cooling again to 20° C., the polymerization is initiated by stirring into the mixture: 16 ml mercaptoethanol, 1 ml 1% iron (II) sulfate solution and 5 ml 35% hydrogen peroxide. After addition of the catalysts, a final temperature of approximately 90° C. is achieved within 2 minutes. 2 ml 40% hydroxylamine hydrochloride solution and 4.5 ml 35% hydrogen peroxide are added to complete the reaction. The post-reaction period amounts to 1 hour.

After cooling to 60° C., neutralization to pH 7 is effected with approximately 220 g 45% caustic lye of soda within a period of 20 minutes, cooling to 20° C. follows. The final product exhibits a turbidity of 10.5 TU(F). The molecular weight (Mw) amounts to 5491 (Table 2).

COMPARATIVE EXAMPLE 1

A mixture of 700 g water and 250 g acrylic acid is manufactured. In accordance with Example 1, the polymerization is initiated at 20° C. and a final temperature of approximately 90° C. achieved after 2 minutes. Postreaction takes place within 1 hour as in Example 1. Subsequently the mixture is cooled to 60° C. and 38 g calcium hydroxide are introduced.

After a period of approximately 2.15 hours the calcium hydroxide is dissolved, the turbidity of the partially neutralized product amounts to 37 TU(F). Within 20 minutes the mixture is neutralized to pH 7 using approximately 220 g 45% caustic lye of soda and cooled to 20° C. The final product exhibits a turbidity of 21.2 TU(F). The molecular mass (Mw) amounts to 5913 (Table 2).

EXAMPLE 2/COMPARATIVE EXAMPLE 2

The same method as in Example 1 and Comparative Example 1, respectively, is used. 225 g acrylic acid and 41.7 g 60% trimethylacryloylamidopropyl ammonium chloride solution are used as monomers. Neutralization is effected with 34.7 g calcium hydroxide and 188 g 45% caustic-soda solution.

EXAMPLE 3/COMPARATIVE EXAMPLE 3

The methods of Example 1 and Comparative Example 1 is used respectively. 200 g acrylic acid and 50 g dimethylaminopropyl acrylamide are used as monomers. Neutralization is carried out with 30.8 g calcium hydroxide and 145 g 45% sodium hydroxide solution.

EXAMPLE 4/COMPARATIVE EXAMPLE 4

The methods are in accordance with in Example 1 and Comparative Example 1 respectively. 175 g acrylic acid and 187.5 g 40% acrylamide solution are used as monomers. Neutralization is carried out with 27.0 g calcium hydroxide and 146 caustic-soda solution.

EXAMPLE 5/COMPARATIVE EXAMPLE 5

The same method as in Example 1 and Comparative Example 1 respectively. 150 g acrylic acid and 100 g methacrylic acid are used as monomers. Neutralization is carried out with 23.1 g calcium hydroxide and 230 g 45% caustic-soda solution.

EXAMPLE 6/COMPARATIVE EXAMPLE 6

The same method as in Example 1 and Comparative Example 1, respectively, is used. 125 g acrylic acid and 125 g 2-acrylamido-2-propane sulfonic acid are used as monomers.

Neutralization is effected with 19.3 g calcium hydroxide and 164 g 45% caustic-soda solution.

TABLE 1

Results of turbidimetry:

| | $Ca(OH)_2$-neutralization time [min] | Turbidity after addition of $Ca(OH)_2$ [TU(F)] | Turbidity in final product [TU(F)] |
|---|---|---|---|
| Example 1 | 15 | 3.5 | 10.5 |
| Comparison 1 | 135 | 37 | 21 |
| Example 2 | 15 | 5.5 | 8 |
| Comparison 2 | 150 | 40.6 | 23.5 |

TABLE 1-continued

| | Results of turbidimetry: | | |
|---|---|---|---|
| | $Ca(OH)_2$-neutralization time [min] | Turbidity after addition of $Ca(OH)_2$ [TU(F)] | Turbidity in final product [TU(F)] |
| Example 3 | 25 | 16.5 | 4.5 |
| Comparison 3 | 160 | 81.5 | 22 |
| Example 4 | 20 | 24 | 9.5 |
| Comparison 4 | 140 | 26.9 | 25 |
| Example 5 | 20 | 18 | 8.1 |
| Comparison 5 | 115 | 29 | 15.2 |
| Example 6 | 15 | 26.3 | 8.3 |
| Comparison 6 | 35 | 18 | 34 |

TABLE 2

| | Molecular weight (Mw) | |
|---|---|---|
| | Example | Comparative Example |
| 1 | 5491 | 5913 |
| 2 | 4317 | 4124 |
| 3 | 10655 | 11250 |
| 4 | 18397 | 17891 |
| 5 | 36320 | 35563 |
| 6 | 13257 | 13814 |

APPLICATION—EXAMPLE 1

The polymer of Example 1 is used as grinding and dispersing aid for calcium carbonate. 17.1 g dry polymer (0.9%-wt. solid matter (polymer) to solid matter (calcium carbonate)) are dissolved in approximately 500 g water, and 1900 g calcium carbonate are then suspended therein. After grinding with a laboratory pearl mill, the suspension contains approximately 77% solid matter, 80% thereof exhibit a degree of grinding of smaller than 1 μm.

The viscosities obtained are listed in Table 3.

APPLICATION—COMPARATIVE EXAMPLE 1

The polymer of Comparative Example 1 is used in accordance with Application-Example 1.

TABLE 3

| Time d after grinding | Application-Example 1 Viscosity [mPa·s] | Application Comparative-Example 1 Viscosity [mPa·s] |
|---|---|---|
| 0 | 439 | 346 |
| 1 | 744 | 764 |
| 7 | 710 | 980 |
| 14 | 610 | 1060 |

What is claimed is:

1. In a process for the production of polyacrylic acids and copolymers of acrylic acid, respectively, with up to 50 mol % of comonomers and having a molecular weight of less than 100,000, measured at a pH-value of 8.0, and being neutralized by 10 to 60 mol-% with calcium hydroxide, the improvement wherein the acrylic acid is partially neutralized with calcium hydroxide prior to polymerization and the further neutralization is carried out with monovalent bases after the polymerization.

2. The process according to claim 1 wherein N-alkyl substituted acrylamides or methacrylamides having a tertiary amino group at the alkyl residue in their basic or quaternized form are used as comonomers.

3. The process according to claim 1 wherein acid groups-containing monomers, such as methacrylic acid or 2-acrylamido-2-propane sulfonic acid are used as comonomers.

4. The process according to claim 1 wherein non-ionogenic monomers, such as acrylamide, methacrylamide, methyl acrylate, hydroxylpropyl acrylate, or acrylonitrile are used as comonomers.

5. The process according to claim 1 wherein the polymers have the molecular weight of preferably 500 to 50,000, in particular a molecular weight of 3,000 to 9,000.

6. The process according to claim 1 wherein sodium hydroxide solution, ammonia, potassium hydroxide solution or amines are used as monovalent bases.

* * * * *